(12) United States Patent
Neuhaeuser et al.

(10) Patent No.: US 9,567,444 B2
(45) Date of Patent: Feb. 14, 2017

(54) CHEMICAL-RESISTANT FILMS IN HIGH OPTICAL QUALITY

(75) Inventors: Achim Neuhaeuser, Mainz (DE); Guenther Dickhaut, Mannheim (DE); Ralf Richter, Hanau (DE); Jonas Scherble, Rossdorf (DE); Wangelis Karampougioukis, Darmstadt (DE)

(73) Assignee: Evonik Röhm GmbH, Darmstadt (DE)

( * ) Notice: Subject to any disclaimer, the term of this patent is extended or adjusted under 35 U.S.C. 154(b) by 1132 days.

(21) Appl. No.: 13/576,268

(22) PCT Filed: Feb. 9, 2011

(86) PCT No.: PCT/EP2011/051848
§ 371 (c)(1),
(2), (4) Date: Jul. 31, 2012

(87) PCT Pub. No.: WO2011/113644
PCT Pub. Date: Sep. 22, 2011

(65) Prior Publication Data
US 2012/0308801 A1    Dec. 6, 2012

(30) Foreign Application Priority Data

Mar. 17, 2010   (DE) .................. 10 2010 002 978
Aug. 2, 2010    (DE) .................. 10 2010 038 756

(51) Int. Cl.
*B29C 47/00*     (2006.01)
*B29C 47/40*     (2006.01)
(Continued)

(52) U.S. Cl.
CPC .............. *C08J 5/00* (2013.01); *B29C 47/0021* (2013.01); *B29C 47/822* (2013.01);
(Continued)

(58) Field of Classification Search
CPC ............ C08J 5/00; C08J 5/18; B29C 47/0021; B29C 47/0004; B29C 47/80; B29C 47/86; B29C 47/884; B29C 2947/92704; B29C 2947/92809; B29C 2947/92876; B29C 2947/92904; B29C 47/40–47/406; B29C 47/408; B29C 47/0085; B29C 47/14; B29C 47/20; B29C 47/865; B29C 47/866; Y10T 428/269; B29K 2079/08; B29L 2007/008
See application file for complete search history.

(56) References Cited

U.S. PATENT DOCUMENTS 2,365,374 A * 12/1944 Bailey ................... B29C 47/00
                                                         264/148
2,876,497 A *  3/1959 Alexander ............ B29C 47/86
                                                         264/209.5
(Continued)

FOREIGN PATENT DOCUMENTS

DE       101 36 286        9/2002
EP       0149335      *   7/1985
(Continued)

OTHER PUBLICATIONS

Japanese Office Action issued Dec. 15, 2014 in Patent Application No. 2012-557459 (English Translation only).
(Continued)

*Primary Examiner* — Jeffrey Wollschlager
(74) *Attorney, Agent, or Firm* — Oblon, McClelland, Maier & Neustadt, L.L.P.

(57) ABSTRACT

The present invention relates to a process for producing transparent polymeric films or plastics moldings of particularly high chemical resistance, having more particularly a very good resistance towards oil-in-water and water-in-oil emulsions, and of high optical quality.

10 Claims, 1 Drawing Sheet

(51) Int. Cl.
*B29C 47/78* (2006.01)
*C08J 5/18* (2006.01)
*C08J 5/00* (2006.01)
*B29C 47/82* (2006.01)
B29C 47/20 (2006.01)
B29C 47/14 (2006.01)
B29C 47/86 (2006.01)
B29C 47/80 (2006.01)
B29C 47/88 (2006.01)
B29K 79/00 (2006.01)
B29L 7/00 (2006.01)

(52) U.S. Cl.
CPC .......... *B29C 47/862* (2013.01); *C08J 5/18* (2013.01); B29C 47/0004 (2013.01); B29C 47/0085 (2013.01); B29C 47/14 (2013.01); B29C 47/20 (2013.01); B29C 47/40 (2013.01); B29C 47/408 (2013.01); B29C 47/80 (2013.01); B29C 47/86 (2013.01); B29C 47/866 (2013.01); B29C 47/884 (2013.01); B29C 2947/92704 (2013.01); B29C 2947/92809 (2013.01); B29C 2947/92876 (2013.01); B29C 2947/92904 (2013.01); B29K 2079/08 (2013.01); B29L 2007/008 (2013.01); C08J 2377/06 (2013.01); Y10T 428/269 (2015.01)

(56) References Cited

U.S. PATENT DOCUMENTS

| | | | | | |
|---|---|---|---|---|---|
| 3,029,474 | A | * | 4/1962 | Holch | B29C 47/28 264/209.1 |
| 3,448,086 | A | * | 6/1969 | Golding | C08G 69/20 264/311 |
| 3,819,775 | A | * | 6/1974 | Mules | B29C 47/165 264/176.1 |
| 3,920,365 | A | * | 11/1975 | Mules | B29C 47/165 425/141 |
| 4,332,543 | A | * | 6/1982 | Fulton | B29C 47/32 264/40.6 |
| 4,680,157 | A | * | 7/1987 | Fujii | B29C 55/02 264/180 |
| 4,830,595 | A | * | 5/1989 | Bentivoglio | B29C 47/0026 219/201 |
| 4,871,493 | A | * | 10/1989 | Goto | B29C 47/0021 264/176.1 |
| 6,065,953 | A | * | 5/2000 | Bentivoglio | B29C 47/0026 425/143 |
| 6,273,701 | B1 | * | 8/2001 | Moriarity | B29C 47/0021 425/141 |
| 2003/0012900 | A1 | * | 1/2003 | Wolf | B32B 27/08 428/35.2 |
| 2003/0235666 | A1 | * | 12/2003 | Buhler | C08G 69/265 428/35.7 |
| 2004/0068037 | A1 | * | 4/2004 | Mitadera | C08J 3/201 524/445 |
| 2004/0166342 | A1 | * | 8/2004 | Wursche | C08K 5/0041 428/474.4 |
| 2005/0250886 | A1 | | 11/2005 | Stoeppelmann et al. | |
| 2006/0293497 | A1 | * | 12/2006 | Martens | C08G 69/265 528/310 |
| 2007/0128442 | A1 | | 6/2007 | Buehler | |
| 2007/0148482 | A1 | * | 6/2007 | Fujinaka | B29D 11/0073 428/474.4 |
| 2008/0094707 | A1 | * | 4/2008 | Tsukane | B32B 27/34 359/507 |
| 2008/0157426 | A1 | * | 7/2008 | Kotwis | B29C 47/0883 264/211.12 |
| 2008/0274355 | A1 | * | 11/2008 | Hewel | C08G 69/265 428/402 |
| 2009/0286096 | A1 | * | 11/2009 | Alting | B32B 27/34 428/474.7 |
| 2011/0160381 | A1 | * | 6/2011 | Konig | B29B 7/481 524/508 |

FOREIGN PATENT DOCUMENTS

| | | |
|---|---|---|
| EP | 1 596 113 | 11/2005 |
| EP | 1 804 094 | 7/2007 |
| JP | 2004-256812 A | 9/2004 |
| JP | 2006-227591 A | 8/2006 |
| JP | 2007-520377 A | 7/2007 |

OTHER PUBLICATIONS

International Search Report Issued Apr. 29, 2011 in PCT/EP11/51848 Filed Feb. 9, 2011.

* cited by examiner

Fig. 1      Fig. 2
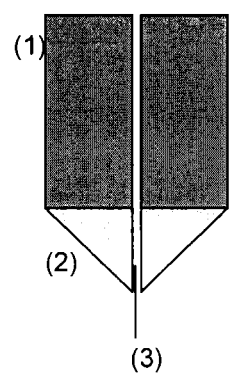
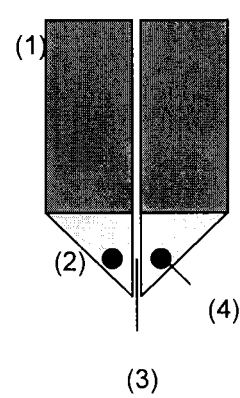

CHEMICAL-RESISTANT FILMS IN HIGH OPTICAL QUALITY

The present invention relates to a process for producing transparent polymeric films or plastics mouldings of particularly high chemical resistance, having more particularly a very good resistance towards oil-in-water and water-in-oil emulsions, and of high optical quality.

PRIOR ART

For applications where the visual appearance requirement is high, exacting demands are imposed on the weathering resistance and above all on the chemical resistance. One example that may be given is that of plastics parts in a vehicle interior. These parts may come into regular contact particularly with oils or with oil-in-water or water-in-oil emulsions from cosmetics or comestibles. A particular problem in this regard is presented by sun creams, sun oils or lotions, for example. Sun creams and sun oils, particularly, include not only inorganic UV absorbers but also considerable quantities of organic UV absorbers, which in many plastics trigger stress cracks. The majority of plastics customary in a vehicle interior do not exhibit sufficient long-term stability with respect to sun cream, and on prolonged use suffer a loss of optical quality.

It is known that moulding compositions such as the polyamides PA PACM12 or PA MACM12 in particular show very good resistance towards chemicals, oils, fats or lipids. Films of these materials are known from EP 1 804 094, JP 2006-227591 and US 2009/0085019, for example. These applications, however, do not provide information on the quality level of the films, and do not provide teaching allowing high optical quality to be ensured. Instead, the processing of such moulding compositions with a high consistency of quality over a prolonged production time to give films or mouldings of high optical quality has not hitherto been described.

Extrusion trials on a flat film line with a slot die, using the process known as the chill roll process, and with the known methods, testify very rapidly to a gradual deterioration in physical quality. For instance, an increase in streaks or specks in the films or mouldings is quickly observed. This results in regular breaks for cleaning and other interruptions to the production operation. Hitherto, therefore, these polyamides have been considered to be impossible to process by extrusion, being processable instead only by injection moulding. This means that films cannot be produced at all, and sheets only with some limitations.

Polyamide PACM12 is prepared from diaminodicyclohexyl-methane and dodecanedioic acid. Polyamide MACM12 is prepared from 3,3-dimethyl-p-diaminocyclohexylmethane and dodecanedioic acid.

Problem

In the light of the prior art, then, it was an object of the present invention to provide a process for producing chemical-resistant, transparent plastics surfaces.

A further object was to provide a process allowing the production of polymeric films and plastics mouldings with a high optical quality in respect in particular of stripes, streaks, gel bodies and other impurities.

An object in particular was to provide a process for producing transparent polymeric films and plastics mouldings with particularly high resistance towards chemicals and especially water-in-oil and oil-in-water emulsions such as cosmetics, an example being sun cream.

Further objects, not explicitly stated, will become apparent from the overall context of the description, claims and examples below.

Solution

The numerals in brackets below relate to the drawings, FIG. 1 to FIG. 2.

The above objects have been achieved through the development of an innovative process for producing polyamide mouldings or polyamide films from polyamide moulding compositions. The process in question is a process for film extrusion or for extrusion of semi-finished products, referred to below for short as film extrusion, from polyamides which have been prepared substantially from aromatic, aliphatic or cycloaliphatic dicarboxylic acids and cycloaliphatic diamines. The polyamides in question may alternatively be those of the AB type, preparable from aminocarboxylic acids. Preferably, however, polyamides of the AA/BB type are preparable from dicarboxylic acids and diamines. The polyamides may more particularly be PA PACM12 or PA MACM12. As already stated, the prior art has failed to provide a film extrusion process for such polyamides that can be carried out over a relatively long time while maintaining high film quality.

The objects have been achieved more particularly through the use of a polyamide having an endgroup fraction of less than 170 mmol/kg, preferably less than 100 mmol/kg, in the process of the invention.

The objects have been achieved more particularly by a process for film extrusion that has the following features:
1.) The carboxyl and/or amino endgroup fraction, preferably the amino endgroup fraction, of the polyamide is less than 35 mmol/kg.
2.) A region of the film die, preferably the die lip (2) of the film die, consisting of a die body (1) and a die lip (2), has a temperature at the exit region of the extrusion die which is higher by 10° C. to 100° C. than that of the die body (1).

Through the use of this process it is possible to produce continuously, over a long time period, polyamide mouldings and polyamide films which show a high optical quality, particularly in respect of stripes, streaks, gel bodies or other impurities. Through the choice of the polyamides used in accordance with the invention, the films have particularly good weathering resistance and chemical resistance, especially with respect to sun cream.

A key aspect of the present invention is the nozzle outlet, comprising a film die (FIGS. 1 to 3). This film die is composed in turn of a die body (1) and a die lip (2). The term film die is used synonymously in the context of this patent, independently of the product thickness, for all slot dies, including those for the production of polymer sheets.

The quality of the polyamide mouldings and polyamide films produced in accordance with the prior art subsides over a relatively short production period owing to the deposition at the nozzle outlet, more precisely on the die lip (2), of solids, which leave stripes or streaks behind on the film. Surprisingly it has been found that by modifying the film die, more particularly the die lip (2), it is possible to prevent this deposition of solids and hence the formation of stripes and streaks.

Critical in accordance with the invention is that at least one region of the film die, preferably the die lip (2), has a temperature which is higher by 10° C. to 100° C., preferably by 20° C. to 80° C., more preferably 30° C. to 70° C., than that of the die body (1). It is preferred more particularly for the temperature of the die lip (2) to be between 10° C. and 100° C., preferably 20° C. to 80° C., more preferably 30° C. to 70° C., higher than the temperature of the die body (1), and for the die body (1) to have a temperature which is higher by not more than 5° C., and is preferably the same, as that of the extruder.

In more detail, the die body (1) generally has a temperature of between 250° C. and 330° C. The die lip (2) at the same time has a temperature of between 290° C. and 370° C. The die lip (2) has an additional heating system (4) for this purpose. The heating system may be realized, for example, via inserted heating cartridges or flat radiators. These systems may be heated electrically or otherwise or via a heated medium such as oil, for example. The temperature may be determined by means for example of thermocouples, of resistance thermometers or of contactless temperature measurement methods such as IR thermometers.

The stated temperatures are measured on the inner wall or very close to the inner wall of the extruder barrel, on the inner wall of the die body or very close to the inner wall of the die body, and on the inner wall of the die lip or very close to the inner wall of the die lip.

In the region within the extrusion die or film die ahead of the nozzle exit, the melt pressure must be high enough to maintain the volatile constituents that are still in solution in the polymer, such as water or possibly monomers, completely in solution and hence to prevent the formation of gas bubbles. This can be ensured by means, for example, of the geometry of the extrusion die, the residual moisture content of the moulding composition used, the melt volume flow rate and the processing temperatures.

The process of the invention is carried out more particularly in the following operating steps:

The moulding composition is melted at a temperature of between 250° C. and 330° C. in an extruder.

The moulding composition emerges via a die lip (2), which has a temperature of between 290 and 370° C., from the extruder.

The moulding composition is taken off in a thickness of between 10 µm and 10 mm via at least one roll or at least one belt.

The moulding composition is conveyed further and in the process is cooled.

Extruders used can be any single-screw, twin-screw or multi-screw extruders that are suitable for processing polyamides. These extruders may be fitted with or without—preferably without—devolatilization ports. The extruders may have a plurality of temperature zones in the region of the extruder barrel, or may have a uniform temperature.

In addition, the polyamide moulding composition preferably has a maximum water content of 0.1% by weight, preferably of 0.02% by weight. The low water content improves the optical quality, particularly in respect of hazing and/or bubble formation, which is to be prevented.

The polyamides of the invention and hence the polyamide mouldings and polyamide films produced are prepared preferably by polycondensation substantially from aromatic, cycloaliphatic or aliphatic dicarboxylic acids, preferably from aromatic or aliphatic dicarboxylic acids, and cycloaliphatic diamines. Substantially means that up to 40% by weight, preferably up to a maximum of 10% by weight, and with particular preference no further components such as aminoundecanoic acid, monofunctional units or other dicarboxylic acids and/or diamines may be incorporated.

Alternatively the polyamides may also be of the AB type, preparable from aminocarboxylic acids. Preference, however, is given to polyamides of the AA/BB type preparable from dicarboxylic acids and diamines.

The cycloaliphatic or aliphatic dicarboxylic acids used are cycloaliphatic, partly cyclic-aliphatic, linear or branched dicarboxylic acids having 4 to 20, preferably having 8 to 16, carbon atoms. Particular preference is given to a dicarboxylic acid having 12 carbon atoms, very preferably dodecanedioic acid (formula 1):

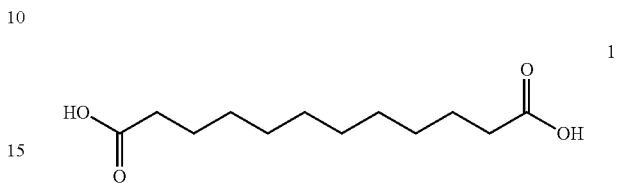

The aromatic dicarboxylic acids used are dicarboxylic acids having one or more aromatic rings. Examples are phthalic acid, isophthalic acid or terephthalic acid.

The cycloaliphatic diamines are aliphatic diamines which have one to three aliphatic rings of 5 to 8, preferably 6, carbons. A preferred cycloaliphatic diamine is diaminodicyclohexylmethane (formula 2) or 3,3-dimethyl-p-diaminocyclohexylmethane (formula 3):

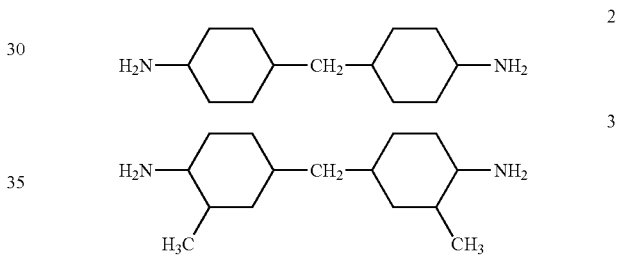

Preferably, in one particular embodiment, the polyamide for the production in accordance with the invention of polyamide mouldings or polyamide films is PA PACM12 or PA MACM12.

In another preferred embodiment the polyamides in question are based on aromatic dicarboxylic acids.

The extrudates produced in accordance with the invention, films for example, may have in general a thickness of between 10 µm and 10 mm. The preferred thickness of the product is dependent on the particular application. For film applications, thicknesses of between 20 µm and 750 µm are preferred. If the films are to be particularly robust, then thicknesses of between 125 µm and 750 µm are particularly preferred. Where particularly high flexibility is needed, for lamination, for example, films having a thickness of between 20 µm and 250 µm are particularly preferred. For optical depth effects in the case of films with reverse-face printing, thicknesses of 125 to 750 µm are preferred.

The term film and the process designation film extrusion do not constitute any restriction to a particular thickness range and are not associated with the capacity for the inventively produced product to be wound. Instead, these formulations describe a process, or the product of that process, which may, generally speaking, comprise extruded semi-finished products, produced preferably with an approximately rectangular cross section.

Polyamide films produced in accordance with the invention, preferably flexible polyamide films, may be used for purposes including lamination to moulding compositions, wood, glass or metals, preferably moulding compositions.

For these purposes, the films prior to lamination may be subjected to one or more of the following processing steps: reverse-face printing, preferably by screen, gravure, pad or digital printing; front-face printing; coating with an adhesion-promoting layer, it also being possible for the coating to take place by printing and for the coating to be applied to layers printed beforehand; forming after heating of the film; and cutting to size. The processing of the film is not confined to the processes stated. The processing procedures may be used in a different order than that stated. It is likewise possible for processing steps to be repeated one or more times.

Lamination may take place by adhesive bonding on the surface of the moulding. In the case of a polymeric material, such as a moulding composition, the polyamide film may be backed with said moulding composition by in-moulding injection coating as well. Alternatively, of course, the moulding composition and the polyamide film may be bonded adhesively to one another. Also possible, furthermore, is the hot lamination of the film to another film or to a sheet. The films of the invention may also be laminated to one or more support films. The film laminate is then processed further in the manner described above for films. The film is preferably printed, more preferably in a gravure printing process, prior to being laminated to the support film.

Furthermore, these films may be used as a decorative film, protective film or packaging film or for producing a film laminate.

However, the polyamide films need not mandatorily be flexible films; instead, it is also possible to use the process of the invention to produce polyamide films having a thickness of between 0.45 mm and 7.0 mm. These materials are therefore more polyamide mouldings, more particularly transparent polyamide sheets.

Polyamide mouldings, more exactly polyamide sheets with such a thickness, may find use, for example, as a transparent liner, covering, in pieces of furniture, in a vehicle interior, in telecommunications devices or as glazing. Additionally possible is their application in the area of personal protection, such as protection from projectiles, from fragments or in explosions, for example.

The polyamide mouldings or polyamide films may alternatively be modified during the extrusion operation itself to form an untreated, transparent and clear film or a corresponding moulding. Hence the films or mouldings may be coloured by addition of colorants such as pigments and/or dyes. Moreover, through the addition of suitable additives, it is possible to influence or improve the scratch resistance, IR or UV absorption, or tactile properties. Adding microparticles allows the light scattering to be modified as well. Scratch resistance, dirt resistance, anti-soiling or modified tactile properties can also be brought about by means of corresponding coatings. The films or mouldings may additionally be bonded with a decorative front or back film in order to produce optical effects such as a wood look.

In the text below, the expression polyamide mouldings may also stand synonymously for polyamide films.

The drawings: The numerals in brackets in the text below relate to the drawings, FIG. 1 and FIG. 2.

FIG. 1 shows a prior-art film die having a lip gap (3) and without lip heating system (4).

FIG. 2 depicts a film die used in accordance with the invention, with a heating system (4) for the die lip (2). (1) is the die body.

General Working Example

The water content was determined by the Karl-Fischer method.

The endgroup determinations are made by titration.

Production of the Polyamide Films/Mouldings

The polyamide film is produced by conventional methods, such as extrusion through a slot die, for example, as in the case of flat film extrusion, blown film extrusion or solution casting.

The plastics moulding may, if desired, also be realized in multi-layer configuration, by adhesive bonding, extrusion coating or laminating in downstream operating steps.

The examples were produced on a commercial flat film extrusion line from Collin. In this case, the polyamide is fed preferably in pellet form—although the form of addition has no effect on the capacity to perform the invention—to a hopper, from which it is conveyed into the extruder. The extruder is composed of a usually metallic barrel, which is heated from the outside, and an extruder screw, which rotates in the extruder about its own axis and therefore conveys the polymer from the feed section after the hopper opening through the extruder. In alternative embodiments, twin-screw or multi-screw extruders can also be used. Through the external heating and the shearing of the polymer in the extruder, the polymer melts and, after the tip of the extruder screw, enters the extrusion die in the form of a film die (or, generally, slot die). Here, the polyamide melt is converted into a flat form and emerges flatly through the nozzle gap from the film die. The film die may also be fed with melt from two or more extruders, thus producing multi-layer films. The plastics web is subsequently cooled on at least one roll and thereafter wound.

The extruder used for the trials, with a closed barrel, two extruder zones heatable separately from one another, and with no devolatilization opening, has a screw diameter of 35 mm with an L/D ratio (Length of the screw/Diameter of the screw) of 25. A commercial three-zone screw is used. For the purposes of the trials, the following temperature settings were made on the extrusion line:

| | |
|---|---|
| Intake (zone after the hopper): | 240° C. |
| Extruder zone 1: | 280° C. |
| Extruder zone 2: | 290° C. |
| Transition region: | 290° C. |
| Film die: | 290° C. |
| Lip heating system: | 350° C. |

(Exception: Comparative Example C4 without lip heating system: 290° C.)

In the trial set-up, the films are produced in single-layer form by what is called the chill roll process, and have a thickness of 50 μm. Subsequently the films are inspected for their quality. This is done by visual comparison and evaluation, the comparison being with a reference specimen of marketable grade in terms of optical quality. By optical quality here is meant parameters including streaks, surface quality, number of gel bodies, number of impurities, and number of particles of degraded material. All of the specimens considered to be marketable received an evaluation of (+). The specimens which were just no longer marketable received an evaluation of (○), and the specimens which were distinctly or very distinctly unmarketable received the evaluations (−) and (−−) respectively.

Chill roll process: Melt web is deposited onto a chill roll, at a point at which the other side of the film is not in roll contact—that is, there is no counter-roll or polishing nip.

Polyamide PA1 comprises PA PACM 12 polyamides from Evonik Degussa GmbH, based for example on the composition of TROGAMID® CX7323. PA1 is a low-viscosity PA PACM 12, which according to the prior art can be used especially for injection moulding applications.

Polyamide PA2 is a medium-viscosity PA PACM 12.

| Example | Material identification | Film quality | Water content by KF | Amino endgroups mmol/kg | Carboxyl endgroups mmol/kg | Endgroup total |
|---------|------------------------|--------------|---------------------|-------------------------|----------------------------|----------------|
| C1 | PA1 | o  | <0.01 | 47 | 69 | 116 |
| C2 | PA1 | −  | 0.05  | 61 | 69 | 130 |
| 1  | PA1 | +  | <0.01 | 31 | 67 | 98  |
| C3 | PA2 | −− | n.d.  | 55 | 47 | 102 |
| 2  | PA2 | +  | 0.014 | 20 | 68 | 88  |
| 3  | PA1 | +  | 0.024 | 20 | 88 | 108 |
| 4  | PA1 | +  | <0.02 | 16 | 75 | 91  |
| 5  | PA1 | +  | 0.019 | 10 | 79 | 89  |
| 6  | PA1 | +  | <0.02 | 11 | 73 | 84  |
| 7  | PA1 | +  | 0.02  | 21 | 69 | 90  |
| 8  | PA2 | +  | 0.009 | 26 | 64 | 90  |
| C4 | PA2 | −  | 0.009 | 26 | 64 | 90  |

The examples denoted with a "C" are non-inventive, comparative examples. In these polyamides, both endgroups are present each at more than 35 mmol/kg in the polyamide. The visual assessment reports that these films have bubbles and/or streaks in a relevant amount ("−"). The best result is shown by Comparative Example C1, which had no bubbles and few streaks.

From Example 3—especially by comparison with Comparative Example C3—it is evident that the film quality is determined not by the chain length, which can be read from the endgroup total, but rather from the proportion of the individual endgroup types.

In Comparative Example C4, the same polyamide was used as in Example 7, the temperature of the die lip being set identically to the temperature of the entire film die and of the extruder. In this example, after an extrusion period of 15 minutes, distinct deposits are found on the die lip, and, accordingly, numerous streaks are found on the film.

The invention claimed is:

1. A process for producing a polyamide film or a polyamide moulding, by extruding a polyamide moulding composition through an extrusion film die comprising a die body and a die lip, the process comprising:
melting the polyamide moulding composition at a temperature of between 250 and 330° C. in a multi-screw extruder comprising a first extruder zone, a second extruder zone, and a transition region, where the temperature of the second extruder zone and the transition region is 10° C. higher than the first extruder zone;

extruding the melted polyamide moulding composition through a die lip having a temperature of between 290 and 370° C.;

removing an extruded composition having a thickness between 10 μm and 10 mm with at least one roll or at least one belt; and conveying and at the same time cooling the extruded composition, wherein:
the composition comprises, in polymerized form, an aromatic, aliphatic or cycloaliphatic dicarboxylic acid and a cycloaliphatic diamine, the polyamide moulding composition has a carboxyl endgroup fraction, an amino endgroup fraction, or both, of less than 35 mmol/kg, and a temperature of the die lip, which is an exit region, is higher than a temperature of the die body by 10° C. to 100° C.

2. The process according to claim 1, wherein the polyamide moulding composition comprises in polymerized form an aliphatic or cycloaliphatic dicarboxylic acid and a cycloaliphatic diamine.

3. The process according to claim 1, wherein the polyamide moulding composition comprises in polymerized form an aromatic dicarboxylic acid and a cycloaliphatic diamine.

4. The process according to claim 2, wherein:
the polyamide moulding composition comprises in polymerized form an aliphatic or cycloaliphatic dicarboxylic acid and a cycloaliphatic diamine; and
the polyamide moulding composition has an amino endgroup fraction of less than 35 mmol/kg.

5. The process according to claim 3, wherein:
the polyamide moulding composition comprises in polymerized form an aromatic dicarboxylic acid and a cycloaliphatic diamine; and
the polyamide moulding composition has an amino endgroup fraction of less than 35 mmol/kg.

6. The process according to claim 1, wherein a pressure at a die outlet is such that all volatile constituents are fully dissolved.

7. The process according to claim 1, wherein the die body has a temperature of between 250° C. and 330° C., and the die lip has a temperature of between 290° C. and 370° C.

8. The process according to claim 1, wherein the polyamide moulding composition has a maximum water content of 0.1% by weight.

9. The process according to claim 1, wherein the die lip comprises a heating system, which is inserted within the die lip.

10. The process according to claim 9, wherein the insert heating system is at least one selected from the group consisting of heating cartridges and flat radiators.

* * * * *